US010134097B2

(12) United States Patent
Hong et al.

(10) Patent No.: US 10,134,097 B2
(45) Date of Patent: Nov. 20, 2018

(54) CONTROLLING THE DISTRIBUTION OF ENERGY RESOURCES ON A SMART GRID

(71) Applicant: INDUSTRY-UNIVERSITY COOPERATION FOUNDATION HANYANG UNIVERSITY ERICA CAMPUS, Asan-si, Gyeonggi-do (KR)

(72) Inventors: Seung-Ho Hong, Ansan-si (KR); Mengmeng Yu, Ansan-si (KR)

(73) Assignee: INDUSTRY-UNIVERSITY COOPERATION FOUNDATION HANYANG UNIVERSITY ERICA CAMPUS, Ansan-si, Gyeonggi-Do (KR)

( * ) Notice: Subject to any disclaimer, the term of this patent is extended or adjusted under 35 U.S.C. 154(b) by 314 days.

(21) Appl. No.: 14/759,090

(22) PCT Filed: Jan. 3, 2014

(86) PCT No.: PCT/KR2014/000050
§ 371 (c)(1),
(2) Date: Jul. 2, 2015

(87) PCT Pub. No.: WO2014/107044
PCT Pub. Date: Jul. 10, 2014

(65) Prior Publication Data
US 2015/0372484 A1 Dec. 24, 2015

(30) Foreign Application Priority Data

Jan. 3, 2013  (KR) .................. 10-2013-0000579
Apr. 15, 2013 (KR) .................. 10-2013-0041072

(51) Int. Cl.
*G06Q 50/06* (2012.01)
*H02J 3/14* (2006.01)
*G06Q 30/02* (2012.01)

(52) U.S. Cl.
CPC ......... *G06Q 50/06* (2013.01); *G06Q 30/0206* (2013.01); *H02J 3/14* (2013.01);
(Continued)

(58) Field of Classification Search
CPC ....... G06Q 50/06; G06Q 30/0206; H02J 3/14; H02J 2003/146; H02J 2003/143;
(Continued)

(56) References Cited

U.S. PATENT DOCUMENTS 9,026,473 B2 * 5/2015 Chassin ................ G06Q 30/08
361/601
9,087,359 B2 * 7/2015 Chassin ................ G06Q 30/08
(Continued)

FOREIGN PATENT DOCUMENTS

JP      2011-239306 A    11/2011
KR 10-2005-0023187 A     3/2005
(Continued)

*Primary Examiner* — Mohammad Ali
*Assistant Examiner* — Kelvin Booker
(74) *Attorney, Agent, or Firm* — Rabin & Berdo, P.C.

(57) ABSTRACT

The present invention relates to a smart grid system and a method for distributing resources in the system. The smart grid system according to the present invention comprises at least one non-shiftable device; at least one controllable device; and at least one shiftable device; wherein price data are provided at each stage, the non-shiftable device is always provided with its resource requirements, the controllable device is provide with resources in the range of its resource requirements, and the shiftable device has its nominal resource requirements but not allowed to be provided with resources at the stage when resource price is highest.

4 Claims, 15 Drawing Sheets

(52) U.S. Cl.
CPC ... *H02J 2003/143* (2013.01); *H02J 2003/146* (2013.01); *Y02B 70/3225* (2013.01); *Y02B 70/3266* (2013.01); *Y04S 20/222* (2013.01); *Y04S 20/224* (2013.01); *Y04S 20/242* (2013.01); *Y04S 50/14* (2013.01)

(58) Field of Classification Search
CPC .... Y04S 20/224; Y04S 20/222; Y04S 20/242; Y04S 50/14; Y02B 70/3225; Y02B 70/3266
See application file for complete search history.

(56) References Cited

U.S. PATENT DOCUMENTS

| | | | | |
|---|---|---|---|---|
| 9,129,337 | B2 * | 9/2015 | Chassin | G06Q 30/08 |
| 9,252,595 | B2 * | 2/2016 | Recker | |
| 9,495,652 | B1 * | 11/2016 | Cook | G06Q 10/06313 |
| 2010/0094476 | A1 * | 4/2010 | Hamilton, II | G01D 4/004 |
| | | | | 700/295 |
| 2010/0106332 | A1 * | 4/2010 | Chassin | G06Q 20/102 |
| | | | | 700/278 |
| 2010/0141153 | A1 * | 6/2010 | Recker | H05B 33/0803 |
| | | | | 315/149 |
| 2010/0179704 | A1 * | 7/2010 | Ozog | G06Q 10/06315 |
| | | | | 700/291 |
| 2011/0010016 | A1 * | 1/2011 | Giroti | G05B 15/02 |
| | | | | 700/291 |
| 2011/0121654 | A1 * | 5/2011 | Recker | H02J 9/065 |
| | | | | 307/66 |
| 2011/0133655 | A1 * | 6/2011 | Recker | H02J 9/02 |
| | | | | 315/159 |
| 2011/0231028 | A1 * | 9/2011 | Ozog | G06Q 10/06 |
| | | | | 700/291 |
| 2011/0283121 | A1 | 11/2011 | Kuroda | |
| 2012/0080944 | A1 * | 4/2012 | Recker | H02J 9/02 |
| | | | | 307/25 |
| 2012/0166008 | A1 | 6/2012 | Jeong | |
| 2012/0271437 | A1 * | 10/2012 | Senart | G06Q 10/06 |
| | | | | 700/29 |
| 2012/0278220 | A1 * | 11/2012 | Chassin | G06Q 40/00 |
| | | | | 705/37 |
| 2012/0278221 | A1 * | 11/2012 | Fuller | G06Q 30/08 |
| | | | | 705/37 |
| 2012/0316688 | A1 * | 12/2012 | Boardman | H02J 13/0079 |
| | | | | 700/291 |
| 2013/0073387 | A1 * | 3/2013 | Heath | G06Q 30/02 |
| | | | | 705/14.53 |
| 2013/0134780 | A1 * | 5/2013 | Parsonnet | H02J 3/005 |
| | | | | 307/25 |
| 2013/0138468 | A1 * | 5/2013 | Oe | G06Q 10/04 |
| | | | | 705/7.22 |
| 2013/0144455 | A1 * | 6/2013 | Oe | G06Q 10/04 |
| | | | | 700/297 |
| 2013/0345884 | A1 * | 12/2013 | Forbes, Jr. | G05B 15/02 |
| | | | | 700/286 |
| 2013/0345888 | A1 * | 12/2013 | Forbes, Jr. | H02J 3/14 |
| | | | | 700/291 |
| 2013/0346768 | A1 * | 12/2013 | Forbes, Jr. | G06F 1/266 |
| | | | | 713/310 |
| 2014/0018969 | A1 * | 1/2014 | Forbes, Jr. | H02J 3/32 |
| | | | | 700/295 |
| 2014/0031999 | A1 * | 1/2014 | Oe | G06Q 10/0631 |
| | | | | 700/291 |
| 2014/0081704 | A1 * | 3/2014 | Strelec | G06Q 30/0202 |
| | | | | 705/7.31 |
| 2014/0188689 | A1 * | 7/2014 | Kalsi | H02J 3/00 |
| | | | | 705/37 |
| 2014/0297567 | A1 * | 10/2014 | Oe | G06Q 50/06 |
| | | | | 705/412 |
| 2014/0324237 | A1 * | 10/2014 | Oe | G06Q 10/06 |
| | | | | 700/287 |
| 2016/0233682 | A1 * | 8/2016 | Do Rosario | H02J 3/387 |
| 2017/0147026 | A1 * | 5/2017 | Forbes, Jr. | H02J 3/32 |

FOREIGN PATENT DOCUMENTS

| | | |
|---|---|---|
| KR | 10-2011-0061871 A | 6/2011 |
| KR | 10-2012-0070903 A | 7/2012 |
| KR | 10-2012-0082652 A | 7/2012 |
| KR | 10-2012-0097551 A | 9/2012 |

* cited by examiner

CONTROLLING THE DISTRIBUTION OF ENERGY RESOURCES ON A SMART GRID

TECHNICAL FIELD

The present invention relates to a smart grid system and a method for distributing resources in the smart grid system.

BACKGROUND ART

Recently, smart grid technologies are selected as a core business of next generation in many countries to be developed actively by many researchers. A smart grid system is aimed at decreasing power consumption. Technologies turning devices on or off are generally disclosed for the reduction of power consumption, as described in Korean publication No. 2012-0097551. However, the prior smart grid system does not provide an appropriate method for distributing energy in order to use energy efficiently.

Also, a blackout occurs frequently because many users consume the energy at a particular time. Therefore, it is needed a novel method for the reduction of energy consumption.

DISCLOSURE

Technical Problem

Accordingly, an aspect of the present invention is to maximize the resource usage efficiency with reducing the cost.

Technical Solution

A smart grid system according to the present invention comprises at least one non-shiftable device; at least one controllable device; and at least one shiftable device; wherein price data are provided at each stage, the non-shiftable device is always provided with its resource requirements, the controllable device is provide with resources in the range of its resource requirements, and the shiftable device has its resource requirements but not allowed to be provided with resources at the stage when resource price is highest.

A resource distribution method of smart grid system according to the present invention comprises determining available resources based on price data; and distributing the available resources differently to at least one device of a plurality of devices; wherein considering priority, fairness, and cost, given weighting factors, respectively, in the distribution of the available resources, and the weighting factors being more than zero.

A resource distribution method of smart grid system according to the present invention comprises determining reserved resources for each device based on historical data including resource information used during previous stages; comparing the determined reserved resources with resources required by the each device; and classifying the devices based on the comparison results; wherein the devices are classified into S-device with surplus resources if the determined reserved resources are more than the required resources, while the devices are classified into D-device with deficiency resources if the determined reserved resources are less than the required resources.

A resource distribution method of smart grid system according to the present invention comprises determining available resources based on price data at stage; selecting an optimal strategy among the pre-specified strategies; and distributing the determined available resources to devices according to the selected strategy; wherein the price data are provided from stage to stage, the selected strategy has the highest satisfaction level of resource usage of the devices at the stage.

Advantageous Effects

As set forth above, the present invention can optimize the efficiency of resource usage since the system and method of the present invention distribute the resource (energy) from the utility to the devices appropriately according to the characteristics of devices, and provide the surplus resources to the deficiency devices.

Also, the present invention can reduce the cost of resource consumption since the system of the invention do not provide the resource to the shiftable devices at the stage when the price is high, and provides the resource to the shiftable devices at the stage when the price is low. The present invention can reduce the load of utility and avoid a blackout accordingly since the resource consumption decreases at the time when a great deal of energy is consumed in an aspect of the utility company.

BEST MODE

Figure 1:
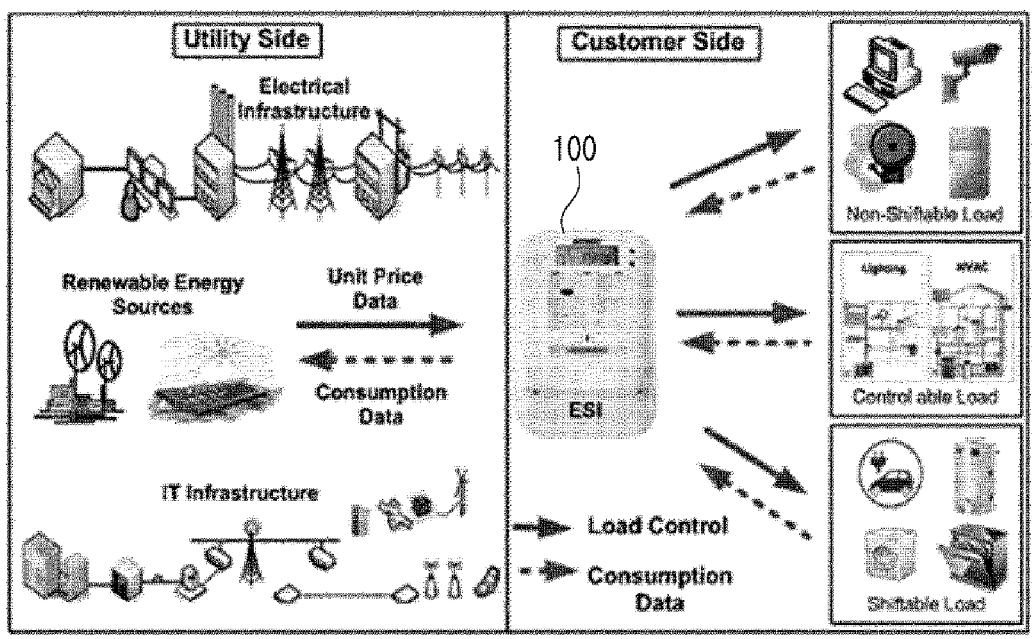
FIG. 1 is a diagram of a smart grid system according to the present invention.

Various embodiments of the present invention will now be described in detail with reference to the accompanying drawings.

The invention discloses a smart grid system for reducing the cost to maximize energy efficiency. The smart grid system presents the method which minimizes the cost to maximize power (resource) usage efficiency in the smart grid environments. The resource price may be changed at each of the predetermined unit time (e.g., 30 minutes or hourly). Accordingly, it is important to reduce the cost to maximize resource usage efficiency by reducing the resource consumption when the resource price is high while increasing the resource consumption when the resource price is low.

Particular devices must consume their resource to be required regardless of the resource cost in the smart grid environments while certain devices need not consume all the resources to be required or may consume their resource at different time. Therefore, the smart grid system of the invention can distribute the resource appropriately considering the smart grid environments (e.g., characteristics of building and individual devices).

As the resource amount required to the individual devices may be different from the actually-consumed resources, the invention presents a system in which surplus devices (S-devices) bargain with deficiency devices (D-devices), wherein S-devices are the devices having their requirement less than the reserved resources and D-devices having their requirement more than the reserved resources. Accordingly, the invention is able to maximize the utility of resource without a waste of resource though the same resources are provided to the buildings and so on.

Moreover, as the price varies periodically in the smart grid environments, it is important to establish the appropriate strategies at each time when the price varies (thereafter, called "at each stage"). The smart grid system of the invention establishes the strategies at each stage. The invention establishes a plurality of strategies in advance and uses a method to choose an appropriate strategy among the plurality of strategies pre-specified to maximize the utility efficiency. Specifically, the chosen strategy may be an optimal strategy to maximize the resource usage satisfaction of the devices at the corresponding stage.

When the system is realized as described above, the system can reduce the user's payments with maximizing the resource efficiency and improve the operation efficiency of the devices because it can provide their required resources to the devices to which the resource consumption is essential.

Now, characteristics of the present invention will now be described in detail with reference to the accompanying drawings.

First, the present invention divides the devices (the loads) into three classes. The devices include non-shiftable devices, controllable devices and shiftable devices. Non-shiftable devices must consume an uninterrupted resource regardless of the resource cost. Controllable devices require a resource consumption but can adjust their amount of resource to be consumed. Shiftable devices can schedule their operation during off-peak hours avoiding expensive on-peak hours. Examples of non-shiftable devices include office PCs, alarm system and refrigerators in homes. Controllable devices include dimming lighting and HVAC units. Non-shiftable device include dishwashers and plug-in hybrid electric vehicles. The devices may be divided into different classes, and it will be understood by those skilled in the art that various changes in class may be made therein without departing from the spirit and scope of the invention.

In view of priority, non-shiftable devices have first priority, controllable device have second priority, and shiftable devices have third priority. Non-shiftable devices have the highest priority in resource distribution.

FIG. 1 illustrates a smart grid system according to the present invention.

Referring to FIG. 1, the smart grid system includes a utility side for providing a resource (energy) and a consumer side for consuming a resource and paying. The utility provides an interface (100) of the consumer side with the unit price data. The consumer sends the consumption data to the utility via the interface (100). The consumption data include resource consumption data from the individual devices in the consumer side.

The interface (100) manages a resource consumption of the individual devices in building based on the unit price data from the utility, and provides the consumption data to the utility. For example, the interface (100) may be ESI (Energy Service Interface) located in the consumer side. The consumption data may be collected from each device by mirroring at each stage, and are transferred to the utility via the interface (100). Therefore, the utility can identify the current resource amount of consumers based on the consumption data. On the other hand, the consumption data are transferred to a resource usage manager (102) to estimate the future usage amount of resources.

The resource usage manager (102) (not shown in the FIG. 1) is located at the consumer side to be connected to the interface (100), and can totally control the operations such as resource distribution, bargaining, strategy planning and so on based on the price data, consumption data, historical data, etc. for the efficiency of resource usage. For example, the resource usage manager (102) may be ESR (Energy System Regulator). The historical data are calculated from the consumption data on a daily and hourly basis, which have the information for the resource usage of each device. The historical data are stored at the resource usage manager (102) or may be stored at the separate EMS (Energy Management System).

The resource usage manager (102) manages the data or information such as the unit price data, consumption data, the historical data, priority data, available budget, device information and strategies. The available budget is specified monthly, daily or hourly in light of the needs of each customer, who can consume its resources in the range of the specified available budget.

According to the present invention, the resource usage manager (102) classifies the devices into non-shiftable devices, controllable devices and shiftable devices. The resource amount of non-shiftable devices may be a fixed value, that of controllable devices may vary in the predetermined range, and that of shiftable device is specified nominally but may not be guaranteed. Controllable devices have maximum and minimum values of resource requirements, wherein the minimum value is guaranteed.

According to the present invention, the resource usage manager (102) assigns the priority to each device. For example, higher priority is always given to non-shiftable devices, followed by controllable devices and shiftable devices. The resources are distributed to the devices based on the priority of devices which depends upon their characteristics and importance, as well as the stage in which they are operated. The priority of the same device is determined differently for each consumer or at each stage. Also, the consumers can change the priority at random.

According to the present invention, the resource usage manager (102) calculates the available resources to be distributed to the devices based on the unit price data received from the utility, allocates resources to each device temporally, determines S-devices and D-devices based on the history of resource consumption, and redistributes surplus resources of S-devices to D-devices According to the present invention, the resource usage manager (102) does not distribute resources to shiftable devices at the peak stage when the resource price is high, and can provide resources to shiftable devices at the stage when the resource price is low; thus the invention can reduce the total cost by decreasing resource consumption at the peak stage. In view of the utility, as higher resource price indicates that many consumers consume considerable resources at the corresponding stage, it is important to reduce resource consumption avoiding a blackout at the peak stage. Therefore, the invention can reduce the load of utility by decreasing resource consumption as described earlier.

According to the present invention, the resource usage manager (102) includes predetermined strategies, and can choose one of strategies at each stage. The strategy chosen by the unit (102) is a strategy which maximizes the resource consumption satisfaction of device at the corresponding stage. The choice of strategies are realized by scoring strategies at each stage.

Smart grid system of the present invention will now be described in detail. For ease of illustration, it is assumed that the interface (100) is the ESI and the resource usage manager (102) is the ESR.

Figure 2:
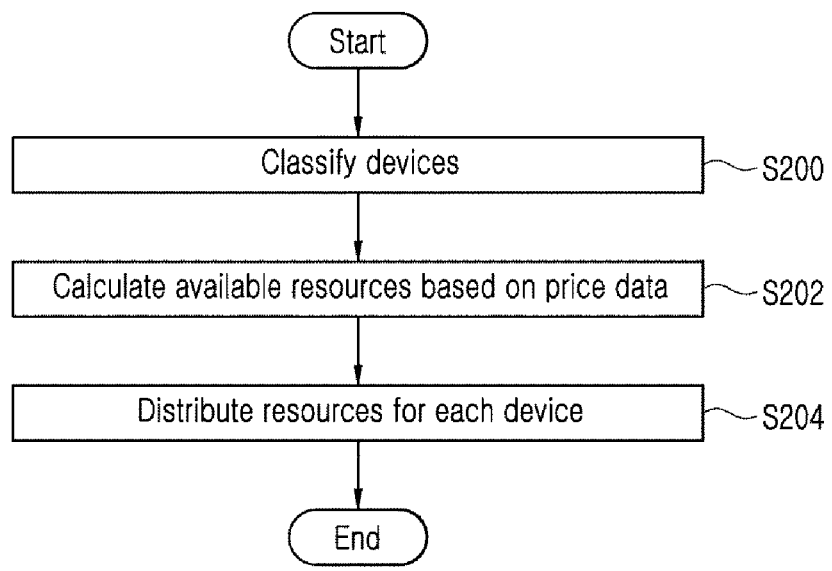
FIG. 2 is a flowchart of resource distribution process in a smart grid system according to the first embodiment of the present invention.

FIG. 2 is a flowchart of resource distribution process in the smart grid system according to the first embodiment of the present invention.

The ESR (102) classifies the devices in buildings into the three classes, i.e., non-shiftable devices, controllable devices and shiftable devices (Step 200). These classes may be categorized considering the characteristics of devices and buildings.

Then, the ESR (102) calculates available resources based on the price data received from the utility (Step 202). That is, the ESR (102) calculates resources available at the current stage. The available resources are calculated based on the price data and available cost, which will be described in detail later.

Then, the ESR (102) performs a control operation to distribute resources to each device (Step 204). Concretely, the ESR (102) is configured to provide all resource requirements to non-shiftable devices, to provide resources to controllable devices in the range of resource requirements, and to provide resource requirements to shiftable devices at the stage when the price is low, while not to provide resource requirements to shiftable devices at the stage when the price is high. Also, the ESR (102) is configured to provide resources to non-shiftable devices with a higher priority when resources are not sufficient, and to provide resources to controllable devices and shiftable devices in order when resources still remain.

As described earlier, the smart grid system of the invention classifies the devices into the three classes, assigns a priority to the classified devices and distributes resources based on the priority.

Figure 3:
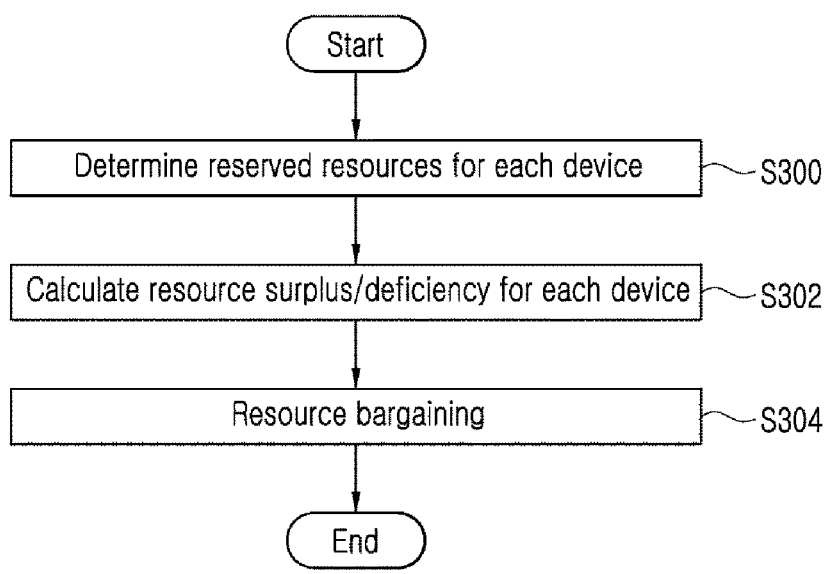
FIG. 3 is a flowchart of resource distribution process in a smart grid system according to the second embodiment of the present invention.

FIG. 3 is a flowchart of resource distribution process in the smart grid system according to the second embodiment of the present invention.

Referring to FIG. 3, the ESI (100) reserves resources for the different devices, using the history data (Step 300). The ESI (100) may not distribute as much resources as the reserved to the devices.

Then, the ESR (102) calculates resource surplus and deficiency for the different devices (Step 302). Concretely, the ESR (102) calculates difference between resources reserved for the different devices and resources required by the devices. The ESR (102) determines surplus if the reserved resource amount is more than the required while it determines deficiency if the reserved resource amount is less than the required.

Then, the ESR (102) bargains surplus resources (Step 304). The ESR (102) performs a control operation to provide surplus resource of the S-devices to the D-devices. Of course, the ESR (102) can provide surplus resources to non-shiftable device which is deficient in resources with a higher priority.

That is, since the smart grid system of the invention distributes surplus resource of the S-devices to the D-devices, it can avoid an unnecessary consumption of resources and enables D-devices to operate ordinarily. Thus, it can address the improved usage efficiency without a waste of resource consumption.

Figure 4:
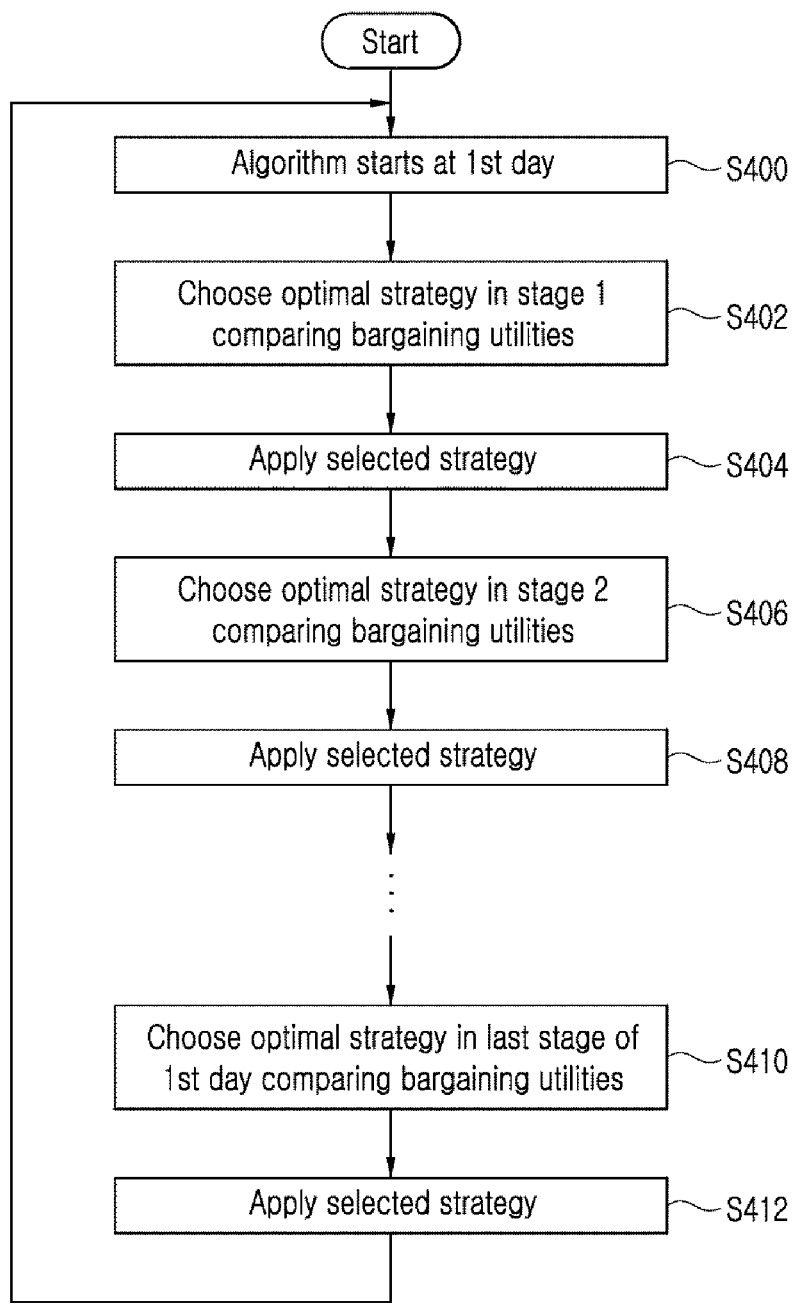
FIG. 4 is a flowchart of resource distribution process in a smart grid system according to the third embodiment of the present invention.

FIG. 4 is a flowchart of resource distribution process in the smart grid system according to the third embodiment of the present invention.

Referring to FIG. 4, an algorithm for resource distribution algorithm starts at the $1^{st}$ day, i.e., at 00:00 A.M (Step 400).

The ESR (102) selects an optimal strategy among the pre-specified strategies in stage 1 which is first stage during the $1^{st}$ day (Step 402). The optimal strategy is a strategy which maximizes the efficiency of resource usage in stage 1, i.e., having the highest satisfaction level of resource usage of devices. The ESR (102) selects a strategy having the highest score after scoring the strategies in the corresponding stage.

The ESR (102) calculates the bargaining utility which indicates the level of satisfaction of devices, for each pre-specified strategy, as described later. The ESR (102) selects the bargaining utility having the highest (i.e., the optimal bargaining utility) value comparing the calculated bargaining utility, so that a strategy having the selected bargaining utility results in an optimal strategy in stage 1. The pre-specified strategies may be the same in all stages, or different in some stages. Also, other indicators may be used to select the optimal strategy among the pre-specified strategies, except the bargaining utility.

Continuously, the ESR (102) applies the selected strategy to the devices. That is, the ESR (102) distributes available resources to the devices based on the selected strategy (Step 404).

If stage 1 ends and stage 2 starts, the ESR (102) selects an optimal strategy among the pre-specified strategies (Step 406).

The ESR (102) calculates the bargaining utility for each pre-specified strategy, and selects the optimal bargaining utility among the calculated bargaining utilities, so that a strategy having the selected bargaining utility is selected as an optimal strategy in stage 2

Continuously, the ESR (102) applies the selected strategy to the devices. That is, the ESR (102) distributes available resources to the devices based on the selected strategy (Step 404).

The ESR (102) iterates the process in the same way as described above to the last stage of the $1^{st}$ day. That is, the ESR (102) iterates the process until it compares the bargaining utility in the last stage of $1^{st}$ day to choose an optimal strategy and apply it to the devices (steps 410 and 412). For instance, one day consists of twenty-four stages if a stage is an hour. Accordingly, the process to choose an optimal strategy and apply it to the devices is performed from stage 1 to stage 24 during the $1^{st}$ day. That is, the ESR (102) iterates the process for each stage. The stage may be divided on the unit basis other than daily basis.

Then, when next day starts, i.e., at 00:00 A.M. of next day, steps 400 to 412 are performed again. The process to choose an optimal strategy and apply it to the devices is performed iteratively from stage 1 to stage 24 during the next day. The process may be performed iteratively daily.

In summary, the smart grid system of the invention pre-specifies the strategies, chooses an optimal strategy among the pre-specified strategies and applies it to the devices at each stage. This process to choose an optimal strategy and apply it to the devices is performed iteratively and infinitely for each stage, so that it can address an improved efficiency of strategy.

Figure 5:
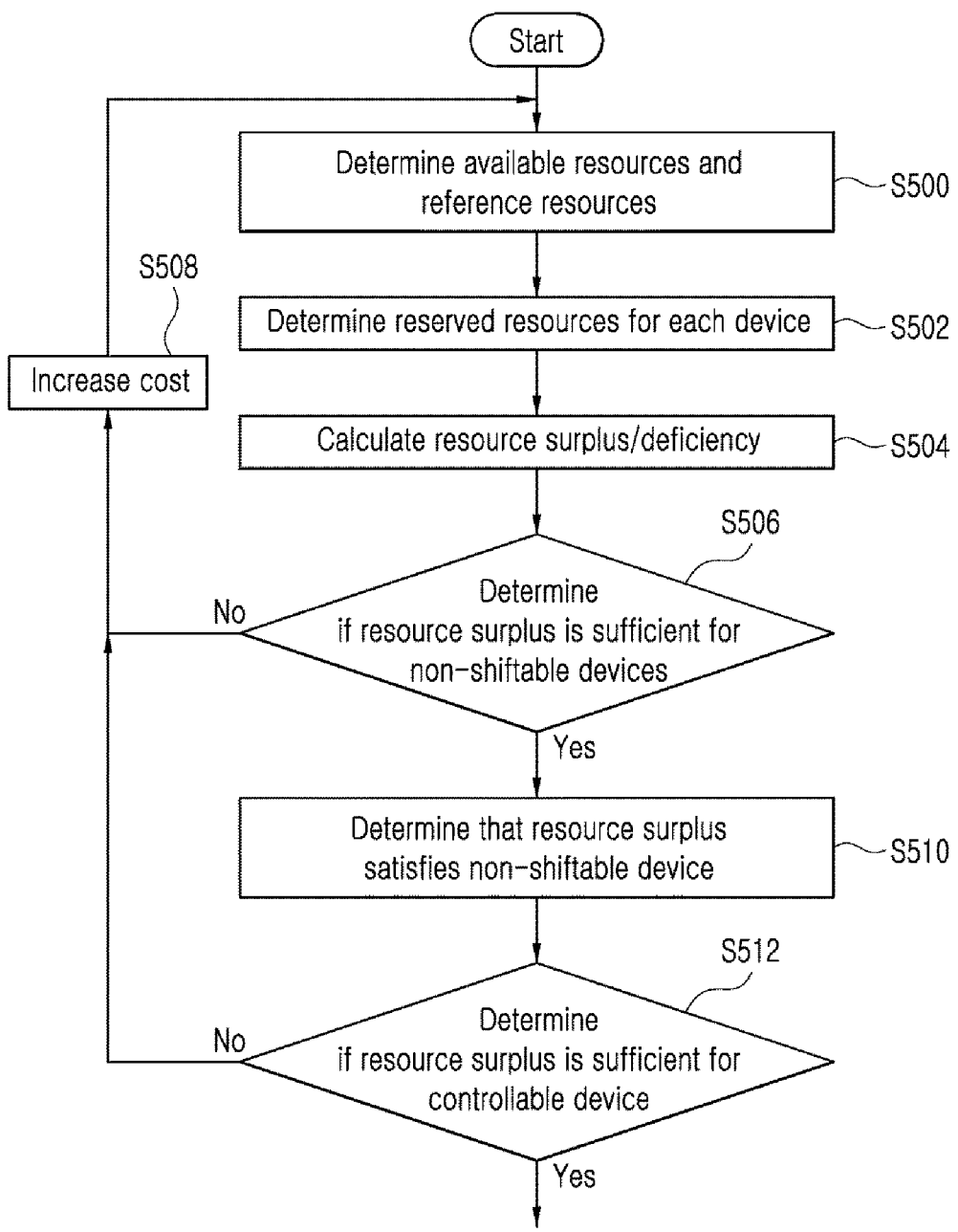
FIGS. 5 and 6 are flowcharts of resource distribution process in a smart grid system according to the fourth embodiment of the present invention.
Figure 6:
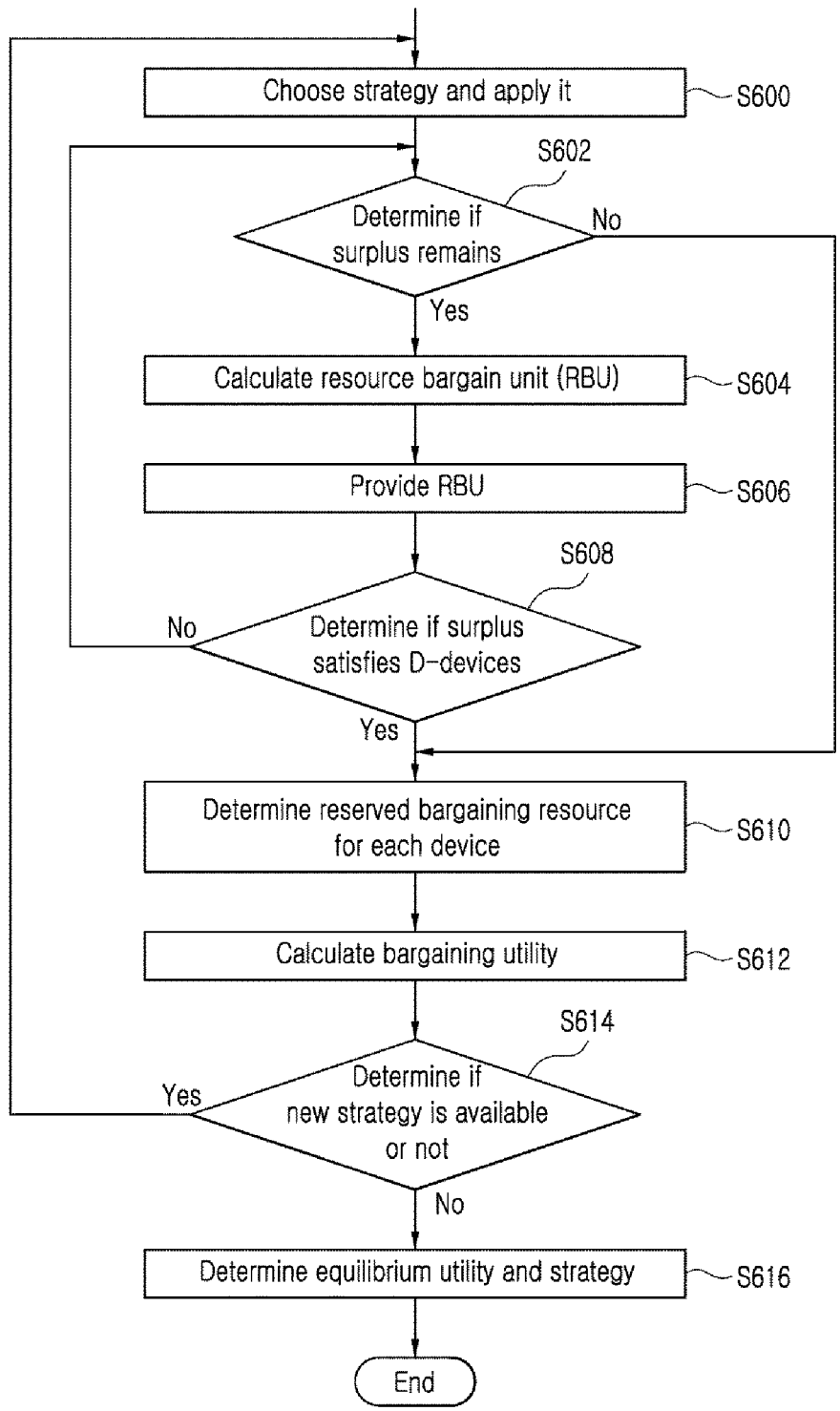

FIGS. 5 and 6 are flowcharts of resource distribution process in the smart grid system according to the fourth embodiment of the present invention. For ease of illustration, it is assumed that stage is on an hourly basis.

Referring to FIGS. 5 and 6, the ESR (102) determines the available resource $R_j^{ava}$ and reference resource $RR_j^i$ for each device at stage j (Step 500). The ESR (102) receives the price data from the utility company, determines the cost at stage j, and calculates the available resource $R_j^{ava}$ for stage j as follows:

$$R_j^{ava} = \frac{\text{Hourly budget (\$)}}{\text{Hourly Unit Rate (\$/kWh)}} \qquad (1)$$

The unit price data varies from stage to stage, since the utility forecasts the unit rates based on consumption data collected during previous stages. Thus, the available resource $R_j^{ava}$ varies from stage to stage according to (1)

The reference resource $RR_j^i$ for device i at stage j is used to estimate requirements for each device at each stage. Generally, historical data are used to calculate reference resources, since the daily requirements for each device do not vary a great deal from one day to the next.

According to the embodiments of the invention, the ESR (102) calculates the reference resource $RR_j^i$, using linear prediction model. The reference resource $RR_j^i$ is determined from the following model:

$$RR_j^i = \sum_{m=1}^{d} \beta_m^m RR_j^i \qquad (2)$$

where $^m RR_j^i$ denotes the reference resource of device i at stage j, calculated m days ago. The $$\beta_m \left( \sum_{m=1}^{d} \beta_m = 1 \right)$$

are the coefficients of the model, and are determined by the ESR (102) according to the characteristics of buildings or complex of buildings. The model for the reference resource may be calculated separately for weekdays and weekends.

Then, after calculating the total amount of available resources, using the calculated reference resource $RR_j^i$, the ESI (100) reserves resources for the different devices (Step 502). The reserved resource $\gamma_j^i$ is calculated from the following formula:

$$\gamma_j^i = \frac{R_j^{ava} \times RR_j^i}{\sum_{i=1}^{N} RR_j^i} \qquad (3)$$

The main reason for including the reference resource in (3) is to reduce the number of transactions during the bargaining process. Continuously, the ESR (102) calculates resource surplus/deficiency $R_j^{i,sd}$ for each device and the total surplus $R_j^{ss}$ (Step 504). ESR (102) determines the resource surplus/deficiency from the difference between the reserved resource and the required resource $RQ_j^i$ as follows:

$$R_j^{i,sd} = \gamma_j^i - RQ_j^i \qquad (4)$$

where the required resource is a fixed value for an non-shiftable device, the minimum required resources for a controllable device, and not specified for a shiftable-device.

The devices are classified into S-device with surplus resources and D-device with resource deficiency according to (4).

The resource surplus for each device is calculated according to (4), and then the total resource surplus is calculated, summing the calculated surplus.

Next, the ESR (102) determines if the surplus satisfies the non-shiftable devices (Step 506). When non-shiftable devices exist as the D-device, the ESR (102) determines if the surplus satisfies the non-shiftable D-devices.

If the surplus does not satisfy the non-shiftable D-devices, the ESR (102) increases the cost (Step 508) and returns to Step 500 because resources for non-shiftable devices are essential.

On the other hand, if the surplus satisfies the non-shiftable D-devices, the ESR (102) determines that the amount of resource surplus is sufficient for the non-shiftable D-devices (Step 510).

Next, the ESR (102) determines if the surplus satisfies the controllable devices (Step 512). When controllable devices exist as the D-device, the ESR (102) determines if the surplus satisfies the minimum requirements of controllable D-devices.

If the surplus does not satisfy the controllable D-devices, the ESR (102) increases the cost (Step 508) and returns to Step 500.

On the other hand, if the surplus satisfies the controllable D-devices, the ESR (102) chooses a particular strategy among the pre-specified strategies and applies it to the devices (Step 600). If the surplus remains, the ESR (102) determines if the remained surplus satisfies the maximum requirements of controllable D-devices and the requirements of shiftable devices, and then chooses a strategy.

Next, the ESR (102) performs a bargaining process.

First, the ESR (102) determines if the resource surplus remains (Step 602).

If the resource surplus does not remain, the ESR (102) determines the reserved bargaining resources (Step 610).

If the resource surplus remains, the ESR (102) calculates the resource bargaining unit $RBU_i^k$ (Step 604). The resource bargaining unit is iteratively distributed to all D-devices. For controllable devices, the size of the resource bargaining unit at k-th iteration of stage j is given by $$RBU\_C_j^k = \min\left[\min_{C_k} \Delta_j^k, \frac{R_{jk}^{ss}}{C_k}\right] \qquad (5)$$

where $R_{jk}^{ss}$ is the total surplus of the k-th iteration in the bargaining process at stage j, $C_k$ is the number of controllable devices whose resources do not reach their maximum requirements in the k-th iteration, $\Delta_j^k$ is the gap between the current resource allocation and the maximum requirements of a controllable device. For shiftable devices, the size of the bargaining unit at the k-th iteration of stage j, denoted by $RBU\_S_j^k$, is given by $$\text{RBU\_S}_j^k = \min\left[\min_{S_k} \Delta_j^k, \frac{R_{jk}^{ss}}{S_k}\right] \quad (6)$$

where $R_{jk}^{ss}$ is the total surplus of the k-th iteration in bargaining process at stage j, $S_k$ is the number of shiftable devices whose resources do not reach their nominal requirements at the k-th iteration, and $\Delta_j^k$ is the gap between the current resource allocation and the nominal requirements of a shiftable device.

Continuously, the ESR (102) provides the resource bargaining unit (Step 606).

Next, the ESR (102) determines if the resource surplus satisfies controllable devices (Step 608).

The ESR (102) returns to step 602 if the resource surplus do not satisfy controllable devices, while ESR (102) calculates the reserved bargaining resource $\gamma_j^i(B_x)$ for each device (Step 610). In detail, after calculating the resource bargaining unit $RBU_i^k$, the ESR (102) initiates resource bargaining among the different kinds of devices. After that, the resource bargaining unit $RBU_i^k$ is iteratively distributed to D-devices that need more resources. For any given strategy, the ESR (102) subtracts $RBU_i^k$ from $RBU_{ss}^{jk}$. This process continues until all devices have been satisfied or the surplus has been exhausted.

Next, the ESR (102) calculates the bargaining utility $U_j(B_x)$ for each strategy x at stage j (Step 612). The bargaining utility is a dimensionless quantity that describes the satisfaction level of devices for a given set of strategies. The bargaining utility function is also system-dependent, and may be determined by energy management policies of buildings and so on.

Next, the ESR (102) determines if new strategies are available or not (Step 614).

The ESR (102) returns to step 600 if the new strategies are available, while the ESR (102) calculates the equilibrium utility from all the strategies, and determines the equilibrium strategy based on the calculation results if the new strategies are not available (Step 616). In detail, the ESR (102) calculates the bargaining solution that maximizes the satisfaction of devices based on the calculation of $U_j(B_x)$ using different strategies, and determines the strategy based on the calculated bargaining solution. The bargaining solution can be calculated via the following formula:

$$U_j^* = \underset{S_x \in X_j}{\text{argmax}} U_j(B_x) \quad (\forall\ 1 \le j \le 24) \quad (7)$$

In summary, the smart grid system of the invention distributes the surplus to the devices at the resource bargaining unit, and determines the strategy that maximizes the satisfaction of devices Though not set forth above, a strategy set is specified in terms of the priority, the fairness and the cost (energy consumption) as follows:

Strategy 1: "High-Priority Devices First" Rule (HPDFR)

The surplus resources are provided to the D-device with highest priority. According to the invention, as controllable devices have higher priority than shiftable devices, the surplus resources are firstly provided to the controllable D-devices, and next to the shiftable devices if the surplus resources still remain. For example, the smart grid system of the invention provides RBUs (Resource Bargaining Unit) to the controllable D-device with highest priority until its maximum requirement has been satisfied, and then to the controllable D-device with next highest priority until its maximum requirement has been satisfied. In this way, the surplus resources are provided to all controllable D-devices, and then to shiftable D-devices if the surplus resources still remain. This process ceases if the surplus has been exhausted or all shiftable D-devices have been satisfied.

Strategy 2: "Class Priority Fairness" Rule (CPFR)

The surplus resources are firstly provided to the controllable D-devices, and next to the shiftable devices if the surplus resources still remain. For example, the smart grid system of the invention provides one RBU to the controllable D-device with highest priority, and then to the controllable D-device with next highest priority, instead of satisfying one controllable D-device at a time. In this way, the surplus resources are provided to controllable D-devices until all controllable D-devices have been satisfied, and then to shiftable D-devices if the surplus resources still remain after all controllable D-devices have been satisfied. This process ceases if the surplus has been exhausted or all shiftable D-devices have been satisfied.

Strategy 3: "all-Devices Fairness" Rule (ADFR)

The smart grid system of the invention provides one RBU to the controllable D-device with highest priority, and then to the controllable D-device with next highest priority. After distributing one RBU to all controllable D-devices, all shiftable devices are provided with one RBU in the same way. After that, if the surplus resources remains, the process returns to the controllable D-devices and repeat itself, continuing until the surplus has been exhausted or all shiftable D-devices have been satisfied Strategy 4: "Class Priority Lowest D-Resource First" (CPLDFR)

The smart grid system of the invention provides the surplus resources to devices with smaller gaps between their current resources and maximum/nominal resources. For example, the smart grid system of the invention provides RBUs to the controllable D-device with smallest gap until its maximum requirement has been satisfied, and then to the controllable D-device with next smallest gap. After all controllable D-devices have been satisfied, if the surplus resources remain, the process continues to the shiftable D-devices. The process ceases if the surplus has been exhausted or all shiftable D-devices have been satisfied.

Strategy 5: "Shiftable Class First" Rule (SCFR)

Since the minimum requirements of the controllable devices have already been satisfied, the smart grid system of the invention provides firstly the surplus resources to the shiftable D-devices, and then to the controllable D-devices if the surplus still remains. For example, the smart grid system of the invention RBUs to the shiftable D-device with highest priority until its nominal requirement has been satisfied, and then to the shiftable D-device with next highest priority until its nominal requirement has been satisfied. After all shiftable D-devices have been satisfied, if the surplus resources remain, the process continues to the controllable D-devices. The process ceases if the surplus has been exhausted or all controllable D-devices have been satisfied.

The smart grid system of the invention may include various strategies except the strategies described above, and present one strategy by combining the above strategies.

For example, the smart grid system of the invention can simultaneously apply Strategy 1 to controllable D-devices and Strategy 2 to shiftable D-devices as a new single strategy.

Once the strategy set has been pre-specified, it is needed to find the strategy that provides the best response in stage j, determined by Equation (8). In this example, the dimensionless bargaining utility function $U_j(B_x)$ that should be maximized is defined as follows:

$$U_j(B_x) = w_1 \frac{P^j - P_{min}^j}{P_{max}^j - P_{min}^j} + w_2 \frac{F^j - F_{min}^j}{F_{max}^j - F_{min}^j} + w_3 \frac{C^j - C_{min}^j}{C_{max}^j - C_{min}^j} \quad (8)$$

where P is the priority of each device, F is the fairness among devices, C is the efficiency of energy consumption at stage j, and w1, w2, and w3 (e.g., more than 0) are the weighting factors, respectively.

$$P^j = \sum_{i=1}^{N} \frac{P_j^i \times \gamma_j^i(B_x)}{RR_j^i}, \; P_{max}^j = N \times \left( \max_i \left[ \frac{P_j^i \times \gamma_j^i(B_x)}{RR_j^i} \right] \right), \quad (9)$$

$$P_{min}^j = N \times \left( \min_i \left[ \frac{P_j^i \times \gamma_j^i(B_x)}{RR_j^i} \right] \right)$$

where $P_j^i$ is the priority of device at stage j.

$$F^j = \sum_{i=1}^{N} \frac{RR_j^i}{|\gamma_j^i(B_x) - ER_j^i|}, \quad (10)$$

$$F_{max}^j = N \times \left( \max_i \left[ \frac{RR_j^i}{|\gamma_j^i(B_x) - ER_j^i|} \right] \right),$$

$$F_{min}^j = N \times \left( \min_i \left[ \frac{RR_j^i}{|\gamma_j^i(B_x) - ER_j^i|} \right] \right)$$

where $ER_j^i$ is the midpoint between the maximum and minimum required resources for a controllable device, or the midpoint between nominal requirement and zero (no resource is reserved) for a shiftable device, at stage j.

$$C^j = \frac{R_j^{ava}}{\sum_{i=1}^{N} \gamma_j^i(B_x)}, \; C_{max}^j = N \times \left( \max_i \left[ \frac{R_j^{ave}}{\gamma_j^i(B_x)} \right] \right), \quad (11)$$

$$C_{min}^j = N \times \left( \min_i \left[ \frac{R_j^{ave}}{\gamma_j^i(B_x)} \right] \right)$$

The bargaining utility $U_j(B_x)$ is determined in (8) based on the priority, the fairness, and the efficiency of energy consumption (cost). $P^j$ in (9) will increase when higher-priority D-devices receive more resources. $F^j$ will increase when the reserved bargaining resource $\gamma_j^i(B_x)$ in (10) is reduced (i.e., electrical resources are more evenly distributed among the devices). The efficiency of energy consumption will be increased when $\gamma_j^i(B_x)$ becomes smaller.

To balance the respective elements (priority, fairness and cost) in (8) are also given the weighting factors, so that the three elements are normalized between 0 and 1. However, the ESR (102) may prefer to give more weight to one or more of these factors, depending on the specific requirements. Accordingly, the ESR (102) may include the weighting factors w1, w2, and w3, which satisfy w1+w2+w3=100, so that $U_j(B_x)$ may lie in the range between 0 and 100.

In summary, the smart grid of the invention provides the best strategy that is determined based on the priority, fairness and cost for each stage. The weights of priority, fairness and cost are specified, depending on the specific requirements of smart gird system. Of course, other elements than the priority, fairness and cost may be considered when choosing the strategy.

Figure 7:
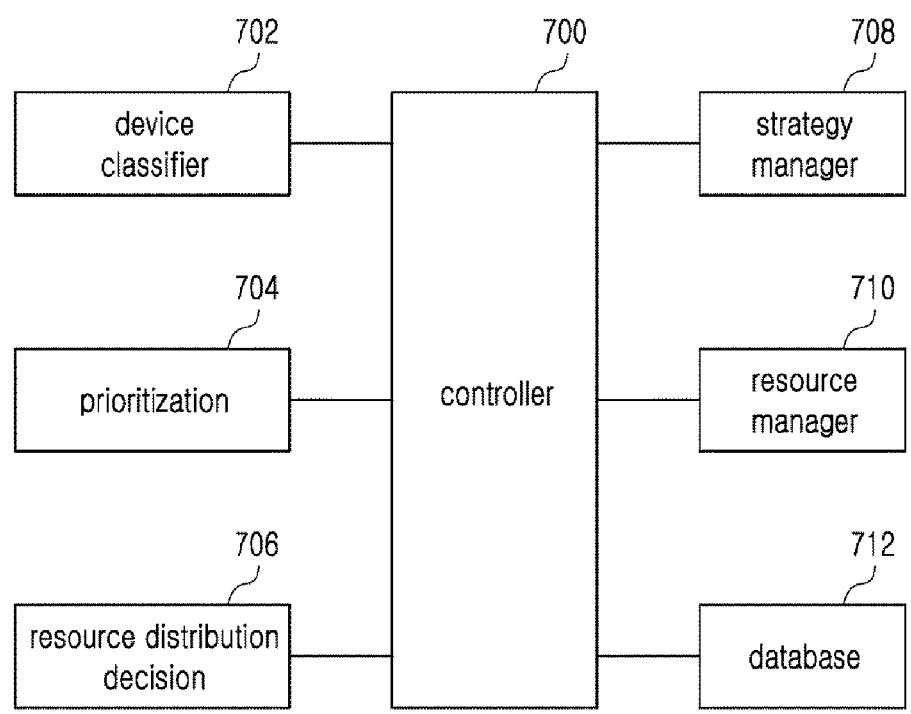
FIG. 7 is a block diagram of a resource usage management unit according to the present invention.

FIG. 7 is a block diagram of the resource usage manager (102) according to the invention.

Referring to FIG. 7, the resource usage manager (102) (e.g., the ESR) comprises a controller 700, a device classifier 702, a prioritization 704, a resource distribution decision 706, a strategy manager 708, a resource manager 710, and a database 712.

The prioritization 704 assigns and manages priorities for each device.

The resource distribution decision 706 determines resource distribution methods which are determined based on the particular strategy chosen by it.

The strategy manager 708 manages the strategies.

The resource manager 710 performs a bargaining process based on the strategies determined by the resource distribution decision 706.

The database 712 stores various data such as device information, unit price data, and consumption data.

The controller 700 controls the operation of each element included in the resource usage manager (102).

Figure 8:
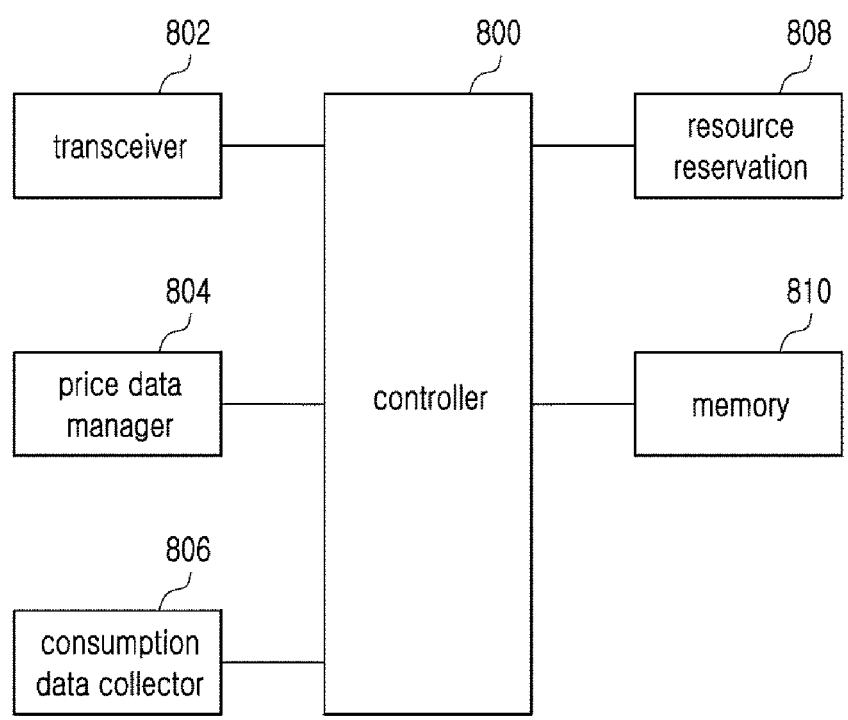
FIG. 8 is a block diagram of an interface according to the present invention.

FIG. 8 is a block diagram of the interface (100) according to the invention.

Referring to FIG. 8, the interface (100) (e.g., the ESI) comprises a controller 800, a transceiver 802, price data manager 804, consumption data collector 806, a resource reservation 808, and a memory 810.

The transceiver 802 provides a communication link between the utility and the devices The price data manager 804 manages the price data provided from the utility.

The consumption data collector 806 collects the consumption data from the devices, and provides the collected consumption data to the utility.

The resource reservation 808 reserves resources based on the historical data.

The controller 800 controls the operation of each element included in the interface (100).

Now, the simulation results for the proposed algorithm will be described in detail.

Figure 9:
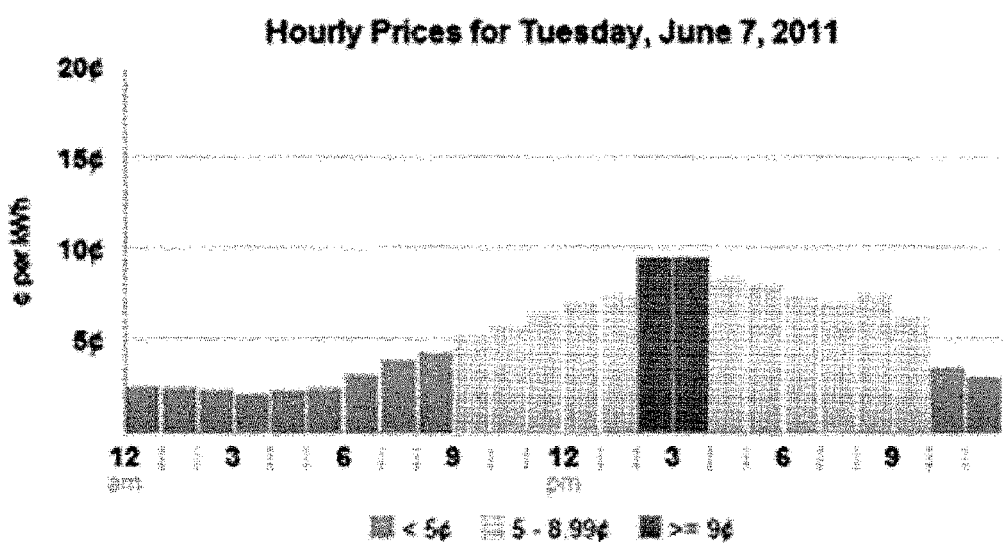
FIG. 9 depicts a graph of hourly price data according to the present invention.
Figure 15:
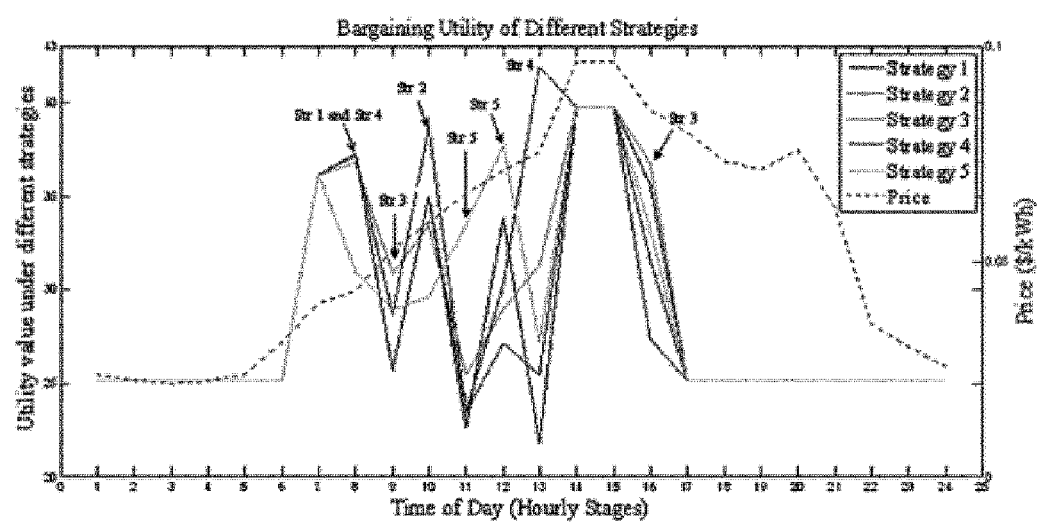
FIG. 15 depicts the simulation results using an optimal strategy for each stage according to the present invention.
Figure 16:
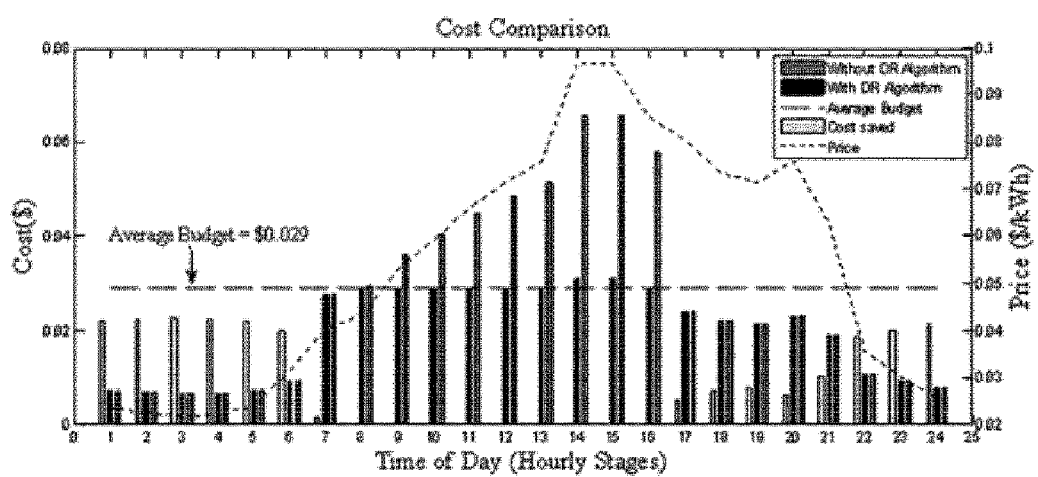
FIG. 16 depicts the cost comparison results according to the present invention.

FIG. 9 depicts a graph of hourly price data according to the present invention. FIGS. 10 to 14 depict the simulation results using various strategies according to the present invention. FIG. 15 depicts the simulation results using an optimal strategy for each stage according to the present invention. FIG. 16 depicts the cost comparison results according to the present invention.

For our simulation, we chose six devices including two non-shiftable devices, two controllable devices, and two shiftable devices as illustrated in table 1. We also considered the low price, high price, and peak price. The price per hour is specified as illustrated in FIG. 9. Note that the ICT (Information Communication Technology) system includes the Internet, telecommunication, personal computer and servers for the buildings.

TABLE 1

| Device class | Device name | Device ID | Priority | Required resource | Working time |
|---|---|---|---|---|---|
| Non-shiftable | Fire Alarm System | NS1 | 1 | 100 watts/h | 24 hours |
|  | ICT System | NS2 | 2 | 100 watts/h | 7 a.m to 5 p.m |
| Controllable | Shared Place Lighting | C1 | 3 | 100 watts/h | 7 a.m to 5 p.m |
|  | HVAC | C2 | 4 | 100 watts/h | 7 a.m to 5 p.m |
| Shiftable | PHEV | S1 | 5 | 100 watts/h | 24 hours |
|  | Water heating | S2 | 6 | 100 watts/h | 24 hours |

The algorithm is assumed to start at 1:00 A.M. every day, and proceeds according to the procedures of FIG. 5 and FIG. 6. We assume the average hourly budget to be $0.029, while the unit price for the first stage is $0.023/kWh. Accordingly, the available resource $R_j^{ava}$ for the first stage is calculated as 1.26 kWh, using (1). We chose five days except weekend as the order of autoregressive (AR) model, denoted by AR (5). The coefficients of the AR (5) model, $\beta_1$ to $\beta_5$, were specified as 0.3, 0.25, 0.2, 0.15, and 0.1, respectively. We employed the required resources given in table 1 as the initial values of reference resources $RR_j^i$ for the $1^{st}$ day.

The simulation results showed that the value of $RR_j^i$ becomes saturated/stable from the $17^{th}$ day onward. For example, at the stage 9 of the $17^{th}$ day, the saturated $RR_j^i$ for the non-shiftable and controllable devices were 40, 40, 20, and 28 (watts) respectively.

Next, we determine the reserved resources $\gamma_j^i$ for each non-shiftable and controllable device. For example, in stage 9, the price is $0.0528, and hence the available resource $R_j^{ava}$ is calculated as 549.1 watts. Based on the $RR_j^i$ calculated in last step, the results for the reserved resource $\gamma_j^i$ are 171.6, 171.6, 85.8, and 120.1 (watts) for NS1, NS2, C1, and C2.

Next, we calculates the resource surplus/deficiency $R_j^{i,sd}$ and the total surplus $R_j^{ss}$ for each non-shiftable and controllable device. For example, the available resources are abundant in stage 9, and thus all devices are S-devices. However, in stage 14, the $\gamma_j^i$ values for NS1, NS2, C1, and C2 are 93.8, 93.8, 46.9, and 65.6 (watts), respectively. By comparing these values with the required resources listed in Table I, we can see that all of these devices are D-devices In most stages, the available resources are sufficient to satisfy all of these devices, stages 14 and 15 being the exceptions. For example, in stage 14 the peak price is $0.09665/kWh, all devices are D-devices, and the total surplus is zero. Accordingly, the ESR (102) increases the budget (cost)

In above steps, the five pre-specified strategies are implemented. Some significant features of each strategy are described in the following paragraphs (FIGS. 10 to 14).

Strategy 1: HPDFR

Figure 10:
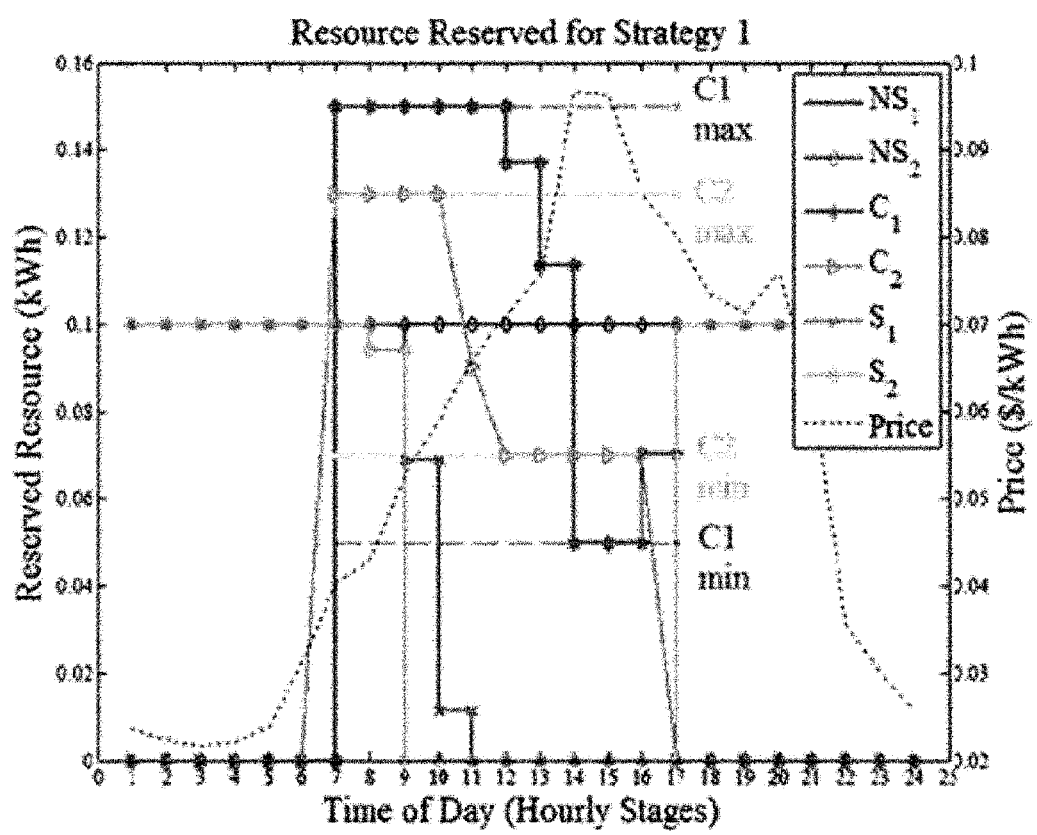
FIGS. 10 to 14 depict the simulation results using various strategies according to the present invention.

Referring to FIG. 10, the controllable devices are satisfied first, based on their priority. When the unit price starts to increase, the lowest-priority S2 device is the first to be preempted (in stage 9), while the controllable devices continue to receive their required maximum resources. As the price continues to increase, S1 is also preempted (in stage 11), while the lower-priority C2 device reduces its resource to the minimum. Finally, C1 device also reduces its resource to the minimum as the unit price peaks (in stages 14 to 16). When the unit price starts to fall, C1 is the first to increase its resource allotment, due to its higher priority.

Strategy 2: CPFR

Figure 11:
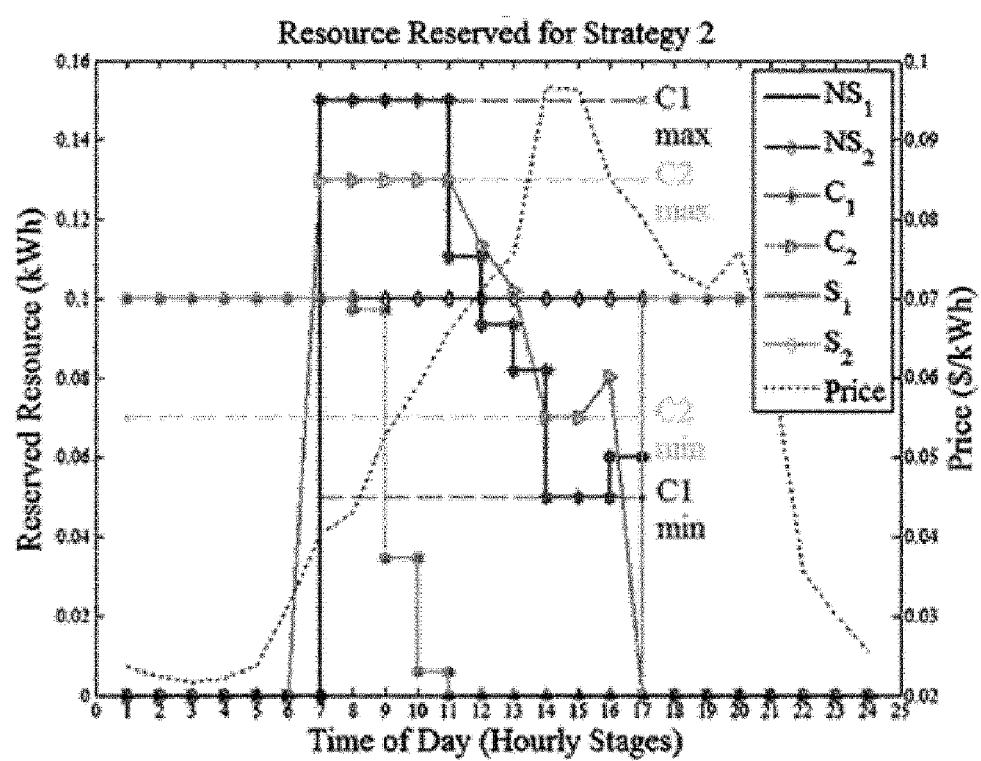

Referring to FIG. 11, as the unit price increases, the reserved resources of both S1 and S2 begin to decrease, and C1 and C2 receive their resources because the aim of this strategy is to provide a fair share of the resources to all devices within same class, irrespective of their priorities. Accordingly, the S1 and S2 resource curves overlap. In stage 11, the reserved resources of S1 and S2 are preempted (zero). The reserved resources of C1 and C2 are the minimum during the peak hour of stage 14. After the peak has passed, C1 and C2 regain some resources.

Strategy 3: ADFR

Figure 12:
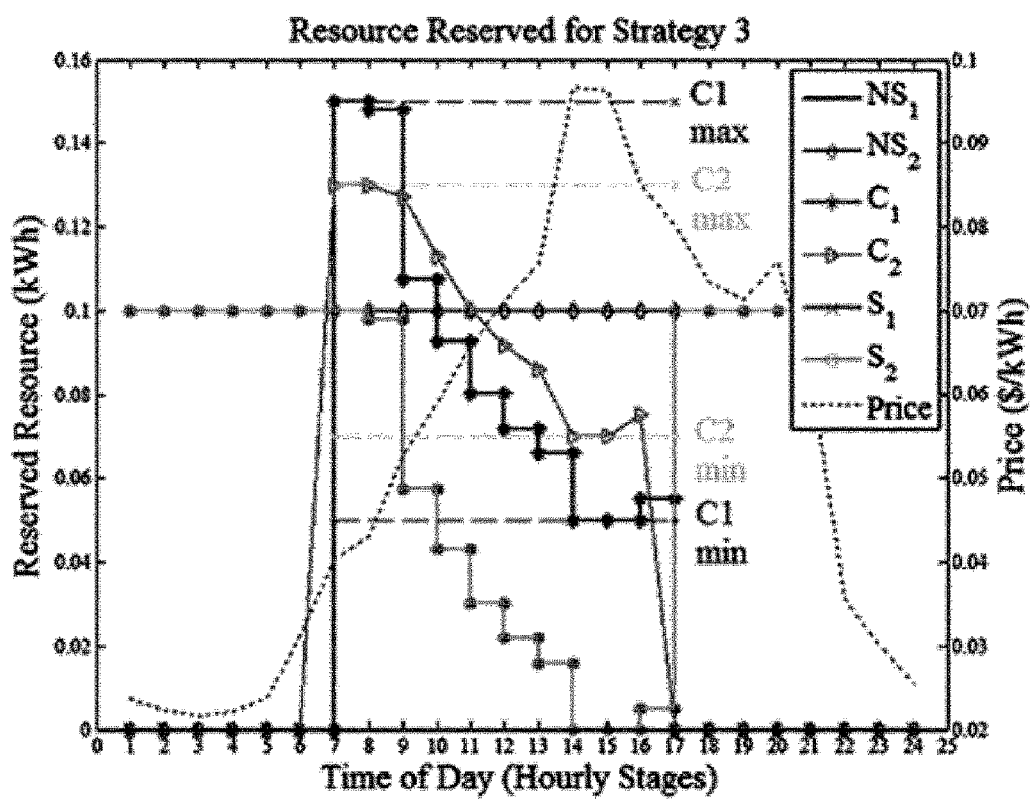

Referring to FIG. 12, this strategy treats all devices fairly, distributing one RBU per iteration to each device from the first controllable device to the last shiftable device. All devices follow a similar decreasing trend as the unit price increases gradually from stage 9.

Strategy 4: CPLDFR

Figure 13:
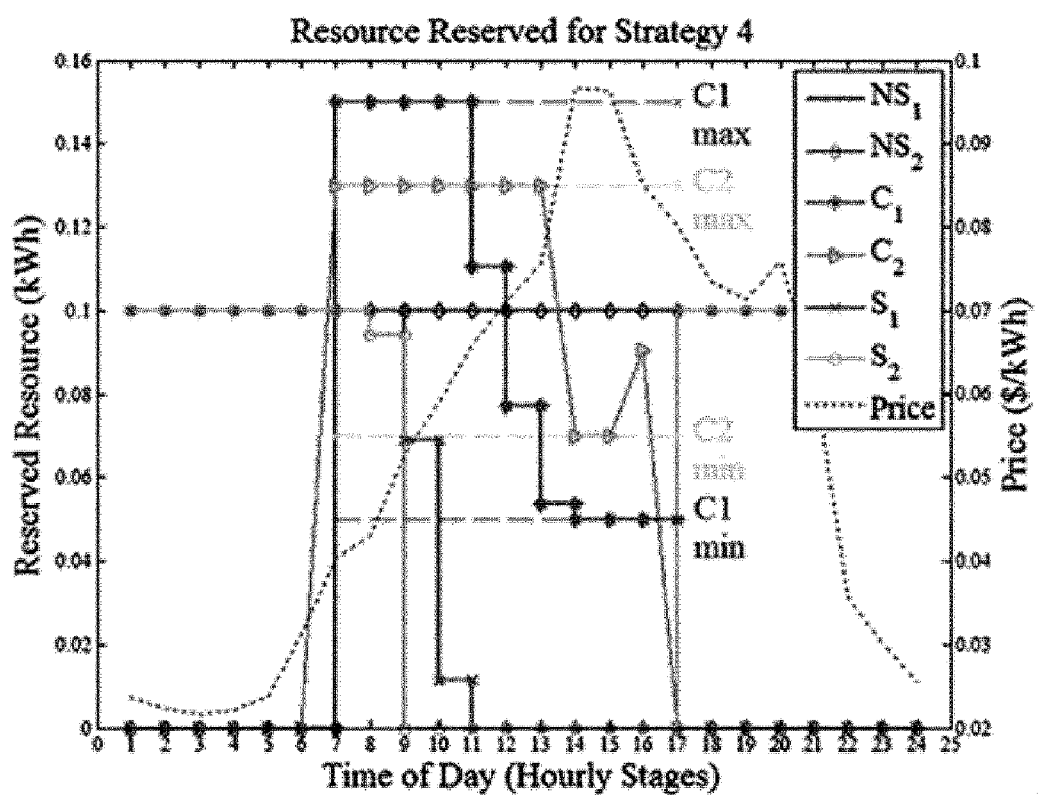

Referring to FIG. 13, as the unit price increases, the higher-priority C1 reduce its resources earlier than C2. This is because C2 has a lower resource requirement for reaching its maximum level. After the peak has passed, C2 is the first device to increase its resource allotments.

Strategy 5: SCFR

Figure 14:
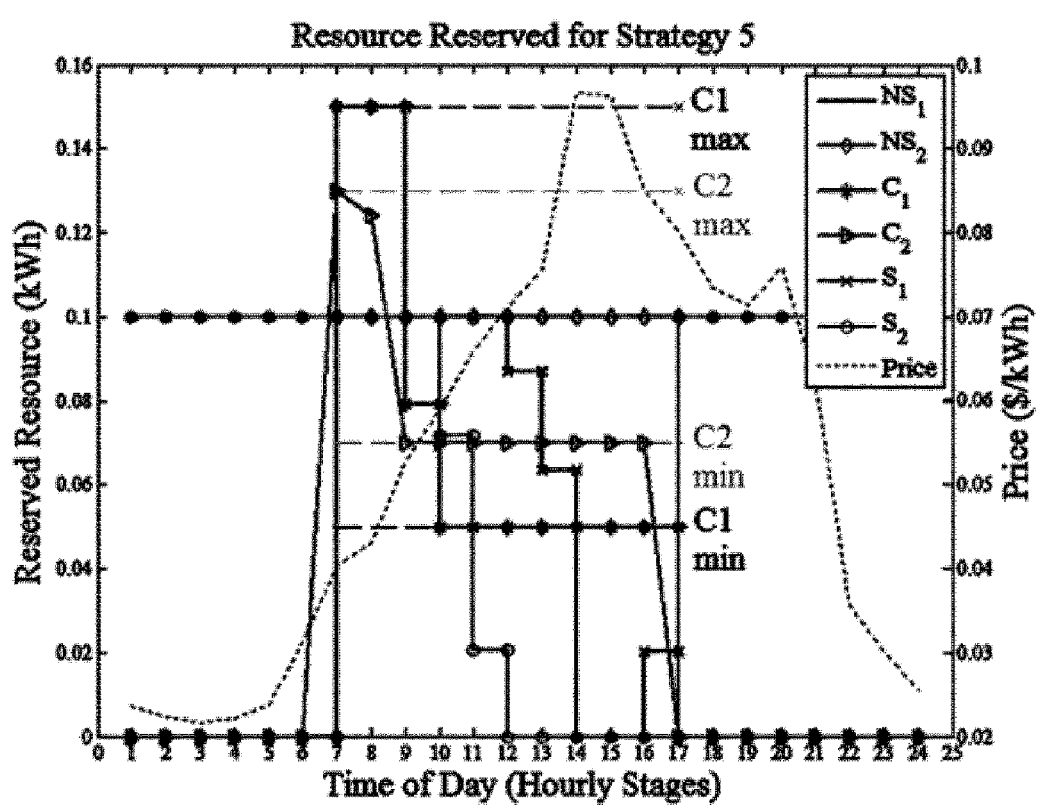

Referring to FIG. 14, since shiftable devices are preferred over controllable devices, the reserved resources of C2 are reduced to its minimum in stage 9. As the unit price begins to increase, S1 decreases its resource to zero (i.e., S1 is shut down) during the peak hour, while the lower-priority S2 gradually decreases its resource to zero. During the peak hour, the controllable devices continues to operate at their minimum resource level. Although the controllable loads are not able to attain their maximum share, the overall system efficiency is increased. After the peak has passed, S1 is the first to regain its resource allotment.

Continuously, the resource usage manager (102) calculates the bargaining utility $U_j(B_x)$ for each strategy at stage j. FIG. 9 shows the bargaining utility for each strategy at stage j.

From stages 1 to 7 and stages 17 to 24, the price is low, and only NS1, S1, and S2 need operate. Hence, their requirements are always satisfied, and all strategies exhibit the same utility. Accordingly, the resource usage manager (102) is free to choose any strategy during these peak hours.

In stage 8, the available resources decrease as the price gradually increases, and the five strategies begin to exhibit different utilities. As FIG. 15 shows, aside from Strategy 5, there is little difference between most of the strategies, since the system designer would normally allot more resources to the lighting and HVAC systems in the early morning, to make the working environment more comfortable, rather than sacrifice their share to shiftable devices. Thus, Strategies 1 and 4 are slightly superior to the others, but exhibit the same utility value.

In stage 9, since the environment has already been adjusted to a comfortable level, and the price increases little, the resource usage manager (102) can implement fairness, using Strategy 3 to give more resources to the shiftable class.

In stage 10, the price increases further, and resources are less abundant than in the previous stages, but still not sharply limited. Accordingly, in this stage, the resource usage manager (102) balances class priority and fairness, using Strategy 2.

In stages 11 and 12, the price increases considerably compared to early morning, thus limiting the available resources, and here we should not only consider priority, but also give greater attention to efficient energy consumption. Since the goal of Strategy 5 is to satisfy more devices with limited available resources, this strategy achieves more efficient energy consumption. Moreover, since this stages are usually lunchtime, we need not provide more resources to the controllable devices after they have reached their minimum requirement levels. Thus, Strategy 5 is selected, since it can sacrifice some of the resources of the shiftable load class to increase the energy efficiency.

In stage 13, the resources are quite limited, due to the high price. Moreover, the temperature rises uncomfortably during stage, and hence the resource usage manager (102) should allocate a greater share of the resources to the C2 (HVAC), rather than other devices. Therefore, Strategy 4 is selected, since it gives priority to C2 (HVAC), which has the smallest gap between current and maximum resource.

In stages 14 and 15, as the price reaches a peak, both C1 and C2 are reduced to the minimum, while S1 and S2 are preempted. Here, the available resources are much less than the normal requirements, and hence all strategies attain the same utility. Accordingly, the resource usage manager (102) is free to choose any strategy during these peak hours.

In stage 16, the price decreases and the temperature is lower, so we can reinstate fairness for all devices, selecting Strategy 3 to share some resources with the shiftable loads.

As described above, the resource usage manager (102) can choose the different strategies according to the specific requirements in the corresponding stage.

As FIG. 16 indicates, the peak-hour cost is reduced efficiently if applying the strategy in this way. The FIG. 16 shows the simulation results (cost results) with and without DR algorithm.

Without the DR algorithm, since all devices can obtain their desired resources regardless of price, as shown in the FIG. 16, the hourly cost increase dramatically as the unit price rises.

With the DR algorithm, the resource usage manager (102) specifies an average hourly cost (budget) for each stage, and selects the optimal strategy for allocating the available resources. In this case, the peak consumption is reduced considerably, while actual requirements of the devices are also met via the selection of an appropriate strategy. We can see that the cost of all stages except stages 14 and 15 are always below or substantially equal to the average cost line.

According to the FIG. 16, the total daily costs without and with the proposed DR algorithm are $0.6462 and $0.4719, respectively, resulting in a daily cost reduction of almost 26.9% by using the proposed algorithm. The green bar indicates the cost savings; the total amount is $0.2278 per day.

Note that the total budget increment is $0.0037 for stages 14 and 15, but the budget increment can be completely compensated by the cost savings during off-peak hours.

In summary, the smart grid system of the invention can address the improved efficiency of energy consumption and the cost reduction, using the DR algorithm which provides the optimal strategy based on the unit price.

INDUSTRIAL APPLICABILITY

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:
1. A resource distribution method in a smart grid system that includes a plurality of devices in a plurality of stages, comprising steps for:
    calculating available resources for each device based on a budget and price data at each stage;
    calculating reference resources for each device based on historical data including resource consumption at previous stages;
    determining reserved resources for each device based on the available resources and the reference resources for each device;
    comparing the determined reserved resources with required resources for each device; and
    classifying the devices based on results of the comparison wherein each device is classified into an S-device with surplus resources if the determined reserved resources are more than the required resources for said each device, and into a D-device with deficiency resources when the determined reserved resources are less than the required resources for said each device, the D-device being one of a non-shiftable device, a controllable device and a shiftable device; and
    calculating a resource bargaining unit (RBU) if a total amount of the surplus resources satisfies all non-shiftable D-devices and satisfies minimum requirements of all controllable D-devices, wherein
    the RBU is iteratively distributed to all D-devices, and
    a size of the RBU at a k-th iteration of each stage is determined as being the smaller one between a minimum value of a gap that is between the required resources and currently allocated resources for each device, and a value of the total surplus resources at the k-th iteration divided by a number of D-devices of which the required resources are not satisfied, k being a positive integer.

2. The resource distribution method of claim 1, wherein the surplus resources are provided to the controllable D-devices by the RBU, and then provided to the shiftable D-devices by the RBU when the surplus resources still remain after all controllable D-devices have been satisfied to their maximum requirements.

3. The resource distribution method of claim 1, wherein the surplus resources are provided to the controllable D-devices when the surplus resources still remain after the surplus resources have been provided to all shiftable D-devices.

4. The resource distribution method of claim 1, wherein the RBU is provided to all shiftable D-devices after being provided to all controllable D-devices, and is repeatedly provided to all shiftable D-devices after being provided to all controllable D-devices until no surplus resources remain.

* * * * *